United States Patent
Frazier et al.

(10) Patent No.: US 7,731,037 B2
(45) Date of Patent: Jun. 8, 2010

(54) SEPARATING SAND FROM FLUIDS PRODUCED BY A WELL

(75) Inventors: Verlin Frazier, Maricopa, CA (US); Joel R. Lehman, Taft, CA (US)

(73) Assignee: Occidental Oil and Gas Holding Corporation, Los Angeles, CA (US)

(*) Notice: Subject to any disclaimer, the term of this patent is extended or adjusted under 35 U.S.C. 154(b) by 111 days.

(21) Appl. No.: 11/955,161

(22) Filed: Dec. 12, 2007

(65) Prior Publication Data

US 2009/0152213 A1 Jun. 18, 2009

(51) Int. Cl.
*B01D 21/02* (2006.01)

(52) U.S. Cl. .................. 210/532.1; 210/533; 166/75.12

(58) Field of Classification Search .............. 210/254, 210/532.1, 533, 537, 539, 540; 96/184; 166/75.12
See application file for complete search history.

(56) References Cited

U.S. PATENT DOCUMENTS

| | | | |
|---|---|---|---|
| 1,496,090 A * | 6/1924 | Marker et al. ............ | 210/533 |
| 1,660,697 A * | 2/1928 | Webb ..................... | 210/533 |
| 1,939,988 A * | 12/1933 | Knoles ................... | 210/537 |
| 2,058,044 A | 10/1936 | Spencer | |
| 3,273,318 A | 9/1966 | Meyer | |
| 3,802,501 A * | 4/1974 | Mecusker ............... | 166/75.12 |
| 4,673,500 A | 6/1987 | Hoofnagle et al. | |
| 4,783,272 A | 11/1988 | Patterson | |
| 5,204,000 A * | 4/1993 | Steadman et al. ......... | 210/539 |
| 5,837,152 A * | 11/1998 | Komistek et al. ......... | 210/540 |
| 6,099,742 A * | 8/2000 | Komistek ................ | 210/540 |
| 6,119,779 A | 9/2000 | Gipson et al. | |
| 6,419,730 B1 | 7/2002 | Chavez | |
| 6,533,929 B2 * | 3/2003 | Binsfeld et al. .......... | 210/540 |
| 6,537,458 B1 | 3/2003 | Polderman | |
| 6,783,683 B2 * | 8/2004 | Collings ................. | 210/532.1 |
| 6,983,852 B2 | 1/2006 | Hemstock et al. | |
| 7,033,496 B2 * | 4/2006 | Thacker et al. .......... | 210/532.1 |
| 7,278,543 B2 * | 10/2007 | Sagatun et al. ........... | 210/539 |
| 2005/0011646 A1 | 1/2005 | Appleford et al. | |
| 2005/0150842 A1 * | 7/2005 | Puik ..................... | 210/539 |
| 2006/0000608 A1 * | 1/2006 | Surjaatmadja et al. ..... | 166/265 |

FOREIGN PATENT DOCUMENTS

JP 2003-275504 9/2003

* cited by examiner

*Primary Examiner*—Christopher Upton
(74) *Attorney, Agent, or Firm*—Fish & Richardson P.C.

(57) ABSTRACT

A settling system may be used to separate and/or remove solid particles, such as sand, from fluids produced by wells. The container of the settling system may be cleaned without need for manned-entry.

13 Claims, 5 Drawing Sheets

SEPARATING SAND FROM FLUIDS PRODUCED BY A WELL

TECHNICAL FIELD

This invention relates to removing solid particles from fluids produced by wells, and more particularly to removing sand from fluids produced by wells.

BACKGROUND

Fluids such as water, oil, and gas exist under pressure in the pores of subterranean reservoir rock formations. Wells are drilled into reservoir rocks to allow fluids (e.g., gaseous and/or liquid hydrocarbons) to flow or to be pumped to the surface of the formation for commercial use. Drag forces created by fluid flow through the reservoir rocks frequently causes particles or small pieces of the reservoir rocks to loosen and flow with the fluids into the well. The loosened rock pieces flow into the well in small particulate form generally referred to as "sand." The sand may vary in size from a few microns to several millimeters in diameter.

Sand-laden fluids flow from reservoir rock into and upward through the casing and tubing of a well. Upon reaching the top of the casing and the tubing of a well, the sand-laden fluids pass through a configuration of control valves known as a well-head. Sand may abrade metal components of the wellhead and/or form restrictions and blockages. Costly intervention methods must be employed to repair the damaged components and/or to remove the sand blockages in the wellhead.

From the well-head, sand-laden fluids enter a flowline, which directs the flow of sand-laden fluids to a separation or other type of processing facility. The flowline often spans a lengthy distance, from a few hundred meters to several thousands of meters, between the well-head and the nearest processing facility. The sand entrained within the fluids can cause abrasion, leaks, and obstructions throughout the span of the flowline, especially where there are abrupt changes in direction and/or elevation of the flowline, often due to the topography of the area. The restrictions, blockages, and/or abrasive damage often occur in remote sections of the flowline that are not readily accessible to vehicles and equipment needed for corrective intervention. Abrasive damage and blockages can also occur at the processing facility, particularly in separators, storage tanks, and/or pumps.

When components of the well are damaged, restricted and/or obstructed by sand, components must be shut-down for repair, which impacts the commercial viability of the well. Because fluids from several wells converge to such facilities, shutting facilities down for repairs requires shutting-in of multiple wells, which adversely impacts the commercial viability of the wells. Separators are used to remove sand and other solid particles from the fluid. However, removing accumulated sand and other solid particles from the separators typically requires manned-entry into such vessels, which poses formidable health and safety hazards, such as possible-entrapment, suffocation, drowning, poisoning, and burning.

SUMMARY

A settling system for at least partially separating solid particles (e.g., sand) from fluids includes a container with one or more inlets, access ports, outlets and/or bypass lines. The container typically allows fluid to flow through the container substantially uninhibited. The inner surface of the container may be constructed so as to not substantially protrude into the cavity of the container.

The container may have a length such that, during use, less than about 25% of the solid particles in the fluid pass through the outlet of the container. The length of the container is preferably about 18 to about 20 feet. The diameter of the container is preferably about 18 to about 24 inches. The cross-sectional area of at least one inlet is less than a cross-sectional area of all or a portion of the container, causing the velocity of fluid flowing from one or more of the inlets to the container decrease. Decreasing the velocity of fluid flowing from an inlet will typically allow particles to settle to a lower region of the container.

Access ports may be coupled to a top surface of the container. In some implementations, one or more bypass lines may be coupled such that fluid may be inhibited from flowing into the container, but instead will bypass the container. Use of a bypass line will allow produced fluids to continue to flow while sand is being removed from the container.

The access ports may be sized so as to allow removal of accumulated sand without the need for manned-entry into the container, which will improve the safety and efficiency of sand removal. Positioning the settling system upstream from the separation and processing facilities of a well production process will typically minimize or eliminate abrasive damage and obstructions caused by particles in fluid. Positioning the settling system proximate the wellhead will typically protect a substantial portion of the well production system.

Furthermore, utilizing a container with an inner surface that does not substantially protrude into a cavity of the container may facilitate sand removal from the container and reduce abrasion damage and/or blockage in the container since the particles in the fluid would not contact protrusions within the container. Another feature of the settling system may include quick access to the interior of the container for the removal of the accumulated sand, using common tools and instruments (such as hand tools), and without the need for manned-entry via access ports positioned on a top surface of the container. Furthermore, the access ports may be sized to preclude manned entry into the container.

The details of various implementations are set forth in the accompanying drawings and the description below. Other features, objects, and advantages of the various implementations will be apparent from the description and drawings, and from the claims.

DESCRIPTION OF DRAWINGS

Like reference symbols in the various drawings indicate like elements.

DETAILED DESCRIPTION

Figure 1:
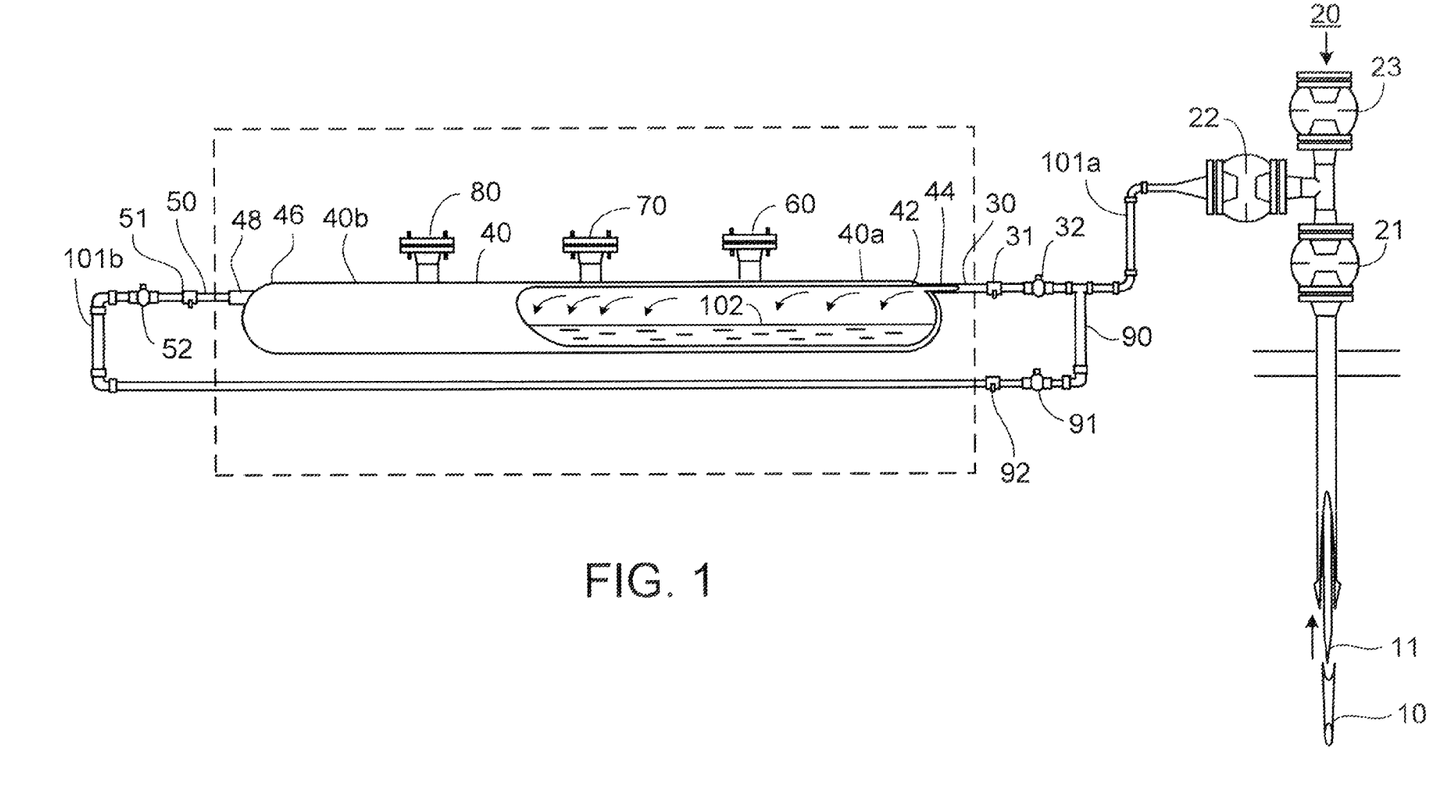
FIG. 1 illustrates a settling system.

FIG. 1 illustrates one implementation of a settling system. The settling system will separate, remove, and/or accumulate solid particles (e.g., sand) from fluids (e.g., gaseous and/or liquid hydrocarbons) produced by a well. The settling system may be positioned within a flowline that spans between a wellhead and a separation or processing facility. In the implementation depicted in FIG. 1, the settling system 100 is positioned proximate a wellhead apparatus 20. Fluids 11 containing particles flow from a subterranean formation (not shown) through production conduit 10 to wellhead apparatus 20. Pressure from the subterranean formation, or mechanical action (e.g., progressive-cavity pump or other methods for pumping fluids containing sand), drive fluids 11 from the production conduit 10 to the wellhead apparatus 20. The wellhead apparatus 20 includes a master-valve 21 and a wing-valve 22 to control the flow of fluids 11, as desired. A valve 23 coupled to the wellhead apparatus 20 restricts fluid flow to provide access to the production tubing 10 to perform maintenance and repairs.

After fluids 11, containing solid particles, flow through the production tubing 10 and wellhead apparatus 20, the fluids enter a flowline 101a which couples the wellhead apparatus to the settling system. The flowline 101a is coupled to an inlet-line 30. From inlet-line 30, the fluids 11 flow into the settling system 100. The settling system illustrated by FIG. 1 includes a container 40; an inlet 44; an outlet 48; access ports 60, 70 and 80, and bypass line 90. The fluids 11 exit container 40 and enter an outlet-line 50. From outlet-line 50 the fluids 11 enter flowline 101b. Once in flowline 101b, the fluids 11 may flow to a separation or other type of processing facility (not shown).

The settling system 100 may include one or more containers 40 coupled in series or parallel. The containers in a multi-container system may contain different structural characteristics. The container(s) may be formed of metal, plastic, or other durable material, and may include a coating, such as a coating to inhibit corrosion. The container(s) may have a substantially circular, substantially oval, substantially square, substantially oblong, substantially rectangular, and/or irregular cross-sectional shape. The container(s) may include flanged ends. A portion of an end of the container(s) may be planar and/or curved. For example, the container(s) may be a cylindrical container with curved ends. The container(s) may be a vessel, such as a pressure vessel. In one implementation, the settling system includes a container that cannot be pressurized due to government or industry standards, as use of this type of container will facilitate government and/or industry approval of the settling system.

The configuration of container 40, as shown in the implementation of FIG. 1, allows all or a portion of sand and/or other particles in fluid 11 to settle in the container. The container 40 is designed such that gravitational forces separate sand in the fluid 11 as the fluid flows through the container.

The container 40 of the implementation shown in FIG. 1 has an internal diameter larger than the internal diameter of inlet line 30, which causes a substantial reduction in the lateral velocity of fluids 11 entering the container, since flow velocity through a conduit is inversely proportional to a diameter of the conduit squared. As fluid 11 enters container 40, lateral drag forces, caused by fluid flow on particles in the fluid, decrease to an extent that vertical gravitational forces pull the particles towards a lower region of the container. A substantial reduction of velocity of the inlet particle-laden fluids causes a reduction of the viscous carrying forces of the fluids so that the viscous carrying forces are no longer sufficient to carry a particle in a horizontal direction. In certain implementations, since the length and the internal diameter of the container are sufficiently sized for suitable retention time to meet criteria of demonstrated scientific conventions such as Stoke's Law, a substantial amount of particles (often including sand) separate and settle within the container rather than being carried by the fluids and exiting the container into the continuation of the flowline.

In some implementations, the settling system will include a container with a cross-sectional area greater than the cross-sectional area of the inlet of the container and/or the conduit coupled to the container (e.g., flowline). The cross-sectional area of the container may, for example, be more than 3 times greater than the cross-sectional area of the inlet conduit.

In some implementations, the container will comprise a volume that is large enough to accumulate bulk quantities of settled particles. For example, the container may remove sand from fluids produced from wells on the order of hundreds of liters. Container 40 may have a length (e.g., to contain a volume of internal space large enough) to provide a sufficient retention time for sand to separate, descend, settle, and/or accumulate in piles 102 at the bottom of the container.

A container may have a length such that, during use, a predetermined amount of sand settles from the fluid into the container and is retained in the container. Depending upon the structural features of a container, at least about 50%, at least about 75%, or at least about 90% of particles may be separated from a fluid. For example, a container may have a length of about 15 feet to about 25 feet. In a preferred implementation, a container may have a length of about 18 feet to about 20 feet.

Figure 2:
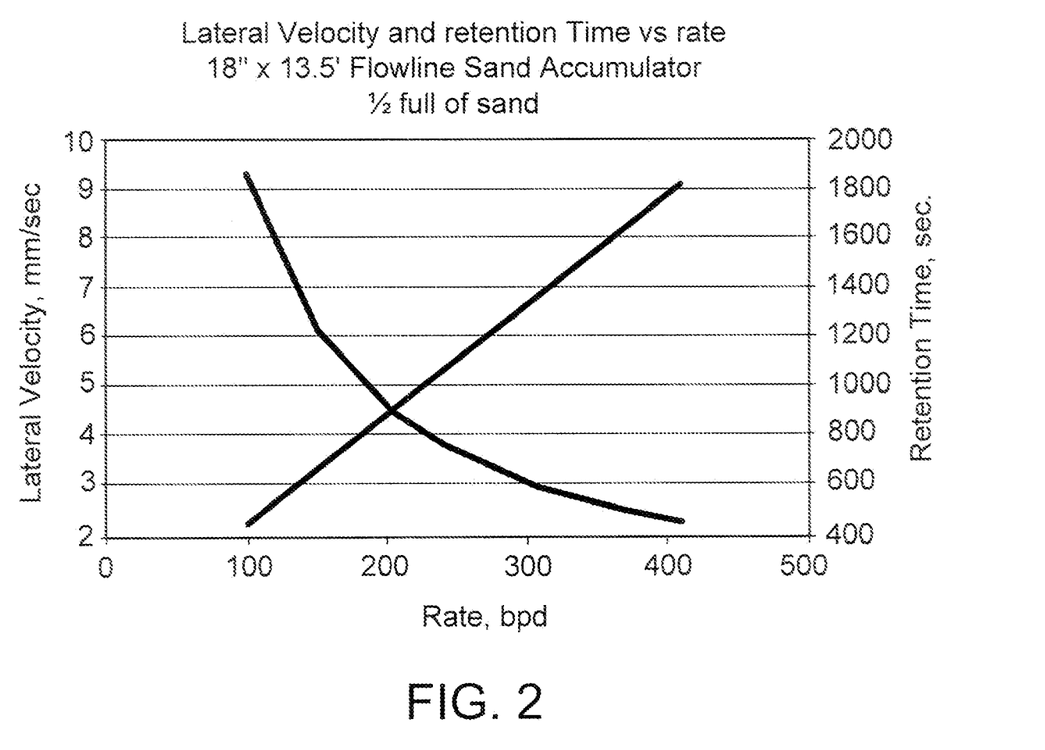
FIG. 2 illustrates a representation of retention times for one implementation of a settling system.

FIG. 2 depicts a representation of typical retention times for one implementation of a settling system. As can be seen from straight line shown on FIG. 2, as the flow rate in barrels per day increases through a container (accumulator) of fixed dimensions, the lateral velocity of the fluid increases. Furthermore, as the flow rate in barrels per day increases through a container (accumulator) of fixed dimensions, the residence time of the fluid in the container decreases. A settling system may require a retention time of less than 1000 seconds to remove at least approximately 75% of particles in fluid. Alternatively, a settling system may require at least 450 seconds to substantially separate sand from fluids flowing through a container. for example a viscous fluid such as oil flowing through an 18 inch diameter by 13.5 foot length container at approximately 400 barrels per day (BPD) may require at least 450 seconds for a substantial amount of solid particles (which may include sand) to settle to a lower region of the container.

In certain implementations, the top of a container will be at a height that makes manned entry difficult or impossible. Since a container may be cleaned mechanically, a container need not be sized for manned entry, thus reducing costs associated with the production and operation of settling systems. Utilizing a container that precludes manned entry will typically facilitate governmental and/or industry approval of the container. In addition, utilizing a container that precludes manned entry should reduce costs of operation of a well, since sand must be mechanically removed without entry into the container (e.g., reduced permit costs, insurance costs, labor costs, etc.).

In some implementations, a container allows fluid to flow through the container substantially uninhibited. In such implementations, the container will not include baffles and/or filters, which may clog and/or be damaged by sand flowing through the container. Additionally, the container may have an inner surface that does not substantially protrude into a cavity of the container. For example, inlets, outlets, and/or access ports may be coupled to the container such that the inlet is approximately flush with the inner surface of the container and/or does not create turbulence such as eddies. Typically, the turbulence of the boundary layer of the fluid flow in the container may be reduced by utilizing a container that has an inner surface that does not substantially protrude into a cavity of the container.

Figure 3:
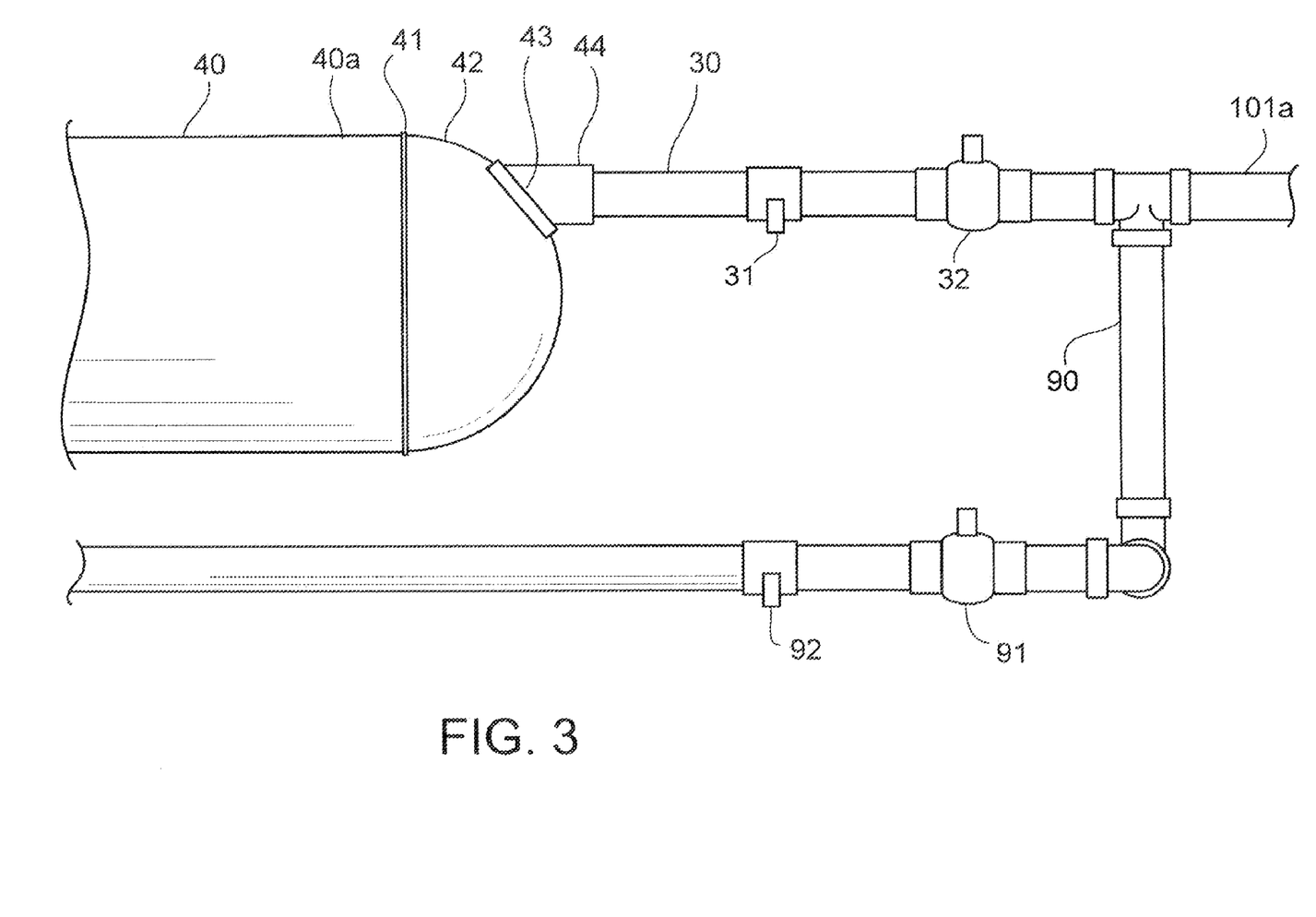
FIG. 3 illustrates a portion of a settling system including an inlet.

FIG. 3 illustrates a portion of one embodiment of a settling system. An inlet end 40a of container 40 may be a hollow, hemispherical end-cap 42. End-cap 42 may be coupled to inlet end 40*a* by a weld 41. One end of a cylindrically-shaped, inlet-sleeve 44 may be coupled to an opening in an upper portion of end-cap 42 by a weld 43. The other end of inlet-sleeve 44 may include internal threads (not shown) that form a connection with external threads (not shown) on an end of inlet-line 30.

Connector 31, located at an end of flowline 101*a* may allow coupling and decoupling of container 40 and its accompanying inlet-line 30 to and from flowline 101*a*. Connector 31 may facilitate repair and/or removal of container 40. Within the span of flowline 101*a* is valve 32 (e.g., a ball-valve), which may allow hydraulic isolating of container 40 and its accompanying inlet-line 30 from flowline 101*a*. Isolation of container 40 may facilitate access (e.g., via access ports, or removal of an end-cap) for sand removal at access ports 60, 70, and 80 shown in FIG. 1. Fluid from flowline 101*a* may be diverted from the container into bypass line 90.

Figure 4:
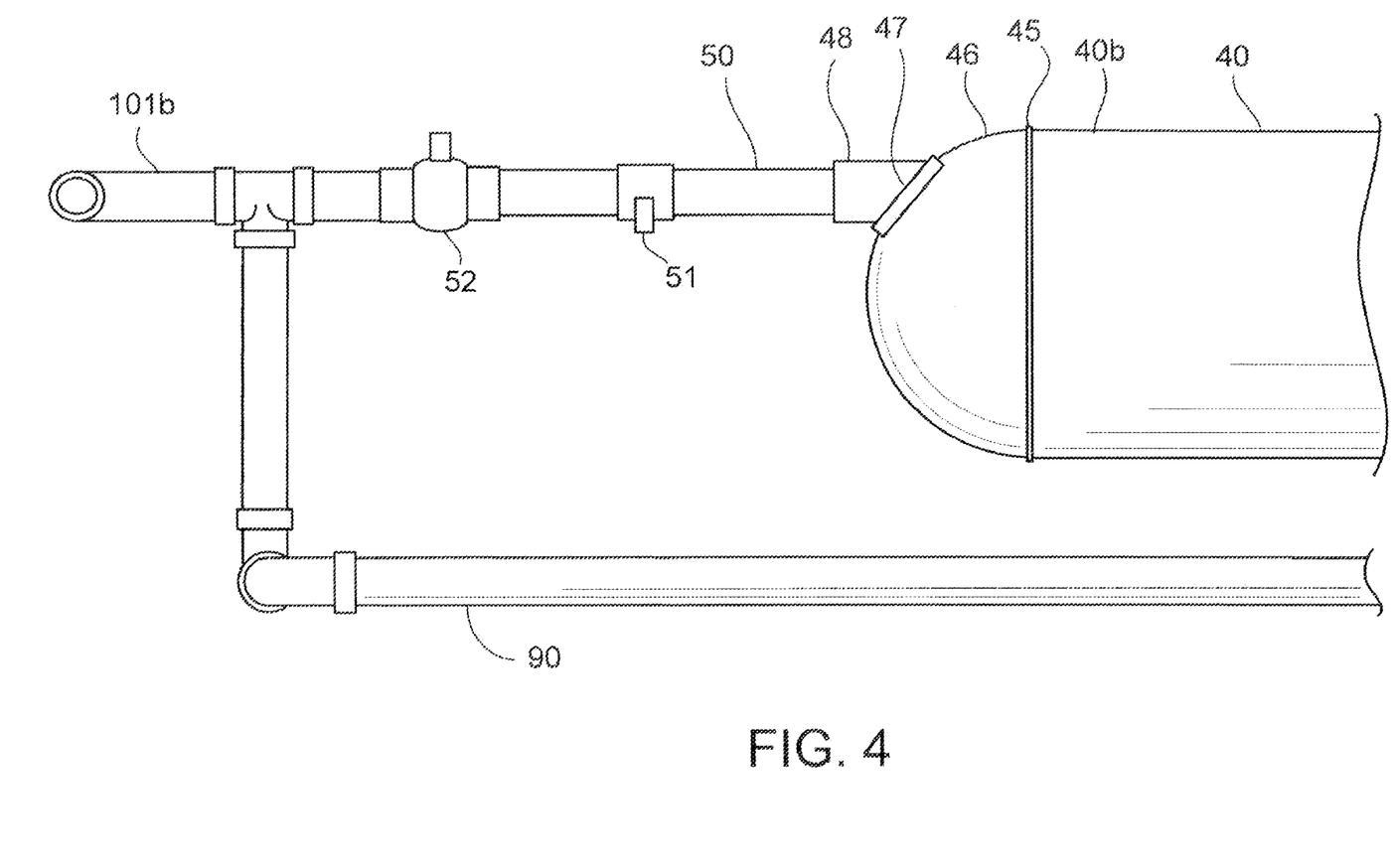
FIG. 4 illustrates a portion of a settling system including an outlet.
Figure 5:
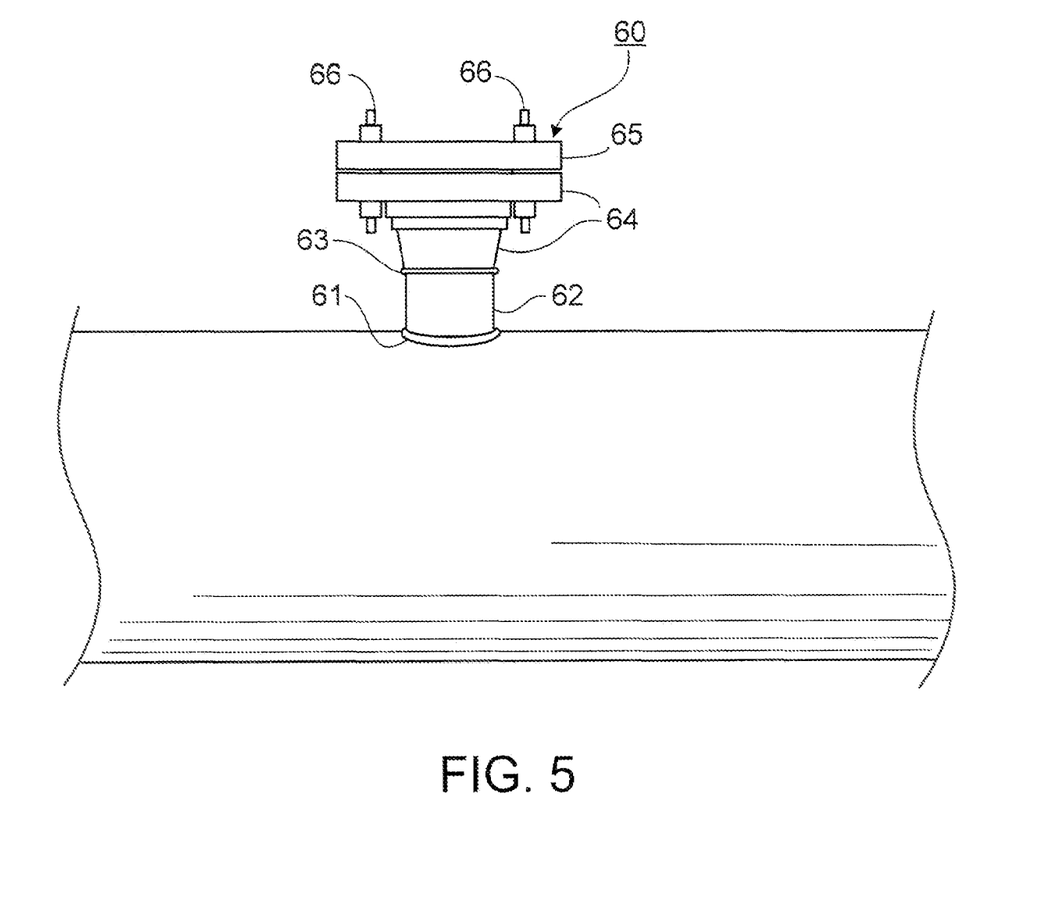
FIG. 5 illustrates an example of an access port.

FIG. 4 illustrates another portion of one implementation of a settling system. An outlet end 40*b* of container 40 may be enclosed by an end-cap 46. End-cap 46 may be coupled to outlet end 40*b* by a weld 45. An end of a cylindrically-shaped, outlet-sleeve 48 may be coupled to an opening proximate an upper portion of end-cap 46 by a weld 47. The other end of the outlet-sleeve 48 possesses internal threads (not shown) which form a connection with the external threads (not shown) on the terminus of outlet-line 50.

Connector 51, located proximate the inlet of flowline 101*b*, may allow coupling and decoupling of container 40 and its accompanying outlet-line 50 to and from flowline 101*b*. Within the span of flowline 101*b* is a valve 52 (e.g., a ball-valve), which may be closed to hydraulically isolate container 40 and its accompanying outlet-line 50 from flowline 101*b* to allow container 40 to be accessed and/or opened for sand removal at entry ports 60, 70, and 80, shown in FIG. 1.

As best shown in FIG. 1, along a length of an upper surface of container 40 are access ports 60, 70, and 80. Access ports allow access to an interior of container 40 for sand removal. For example, access ports may be used by an operator during use to remove quantities of sand 102 accumulated in the container 40. In some implementations, mechanical sand removal systems (e.g., vacuums, hoses, pumps, etc.) may be coupled to access ports and/or may be inserted through access ports to access an interior of the container to remove accumulated sand. Access ports may be manually removed (i.e., removed using bare human hands, with or without use of hand-held tools) to allow instruments such as suction-hoses and spray nozzles to readily probe and remove the accumulated sand from within. In certain implementations, all access ports are located on a top surface. Positioning access ports on the top surface may facilitate access by operators to the access ports.

As shown in FIG. 1, a plurality of access ports 60, 70, and 80 may be installed along the length of the crest of the container 40. In some implementations, access ports 60, 70, and 80 may be oriented perpendicular to the horizontal plane. Access ports 60, 70, and 80 may be approximately equally spaced from each other. A set of access ports 60, 70, and 80 may be centered between container ends 40*a* and 40*b*. The orientation and the spacing of access ports 60, 70, and 80 may vary based on the types and the shapes of instruments used to extract accumulated sand 102 from the interior of container 40 and/or the location at which sand 102 is expected to accumulate.

Access ports 60, 70, and 80 may be similar in construction, material, and/or size. FIG. 4 illustrates an exemplary access port 60. Access port 60 may include a conduit 62. Conduit 62 may be have any regular or irregular cross-sectional shape The internal diameter and the length of conduit 62 are sized to permit the passage of instruments, such as vacuum hoses and forced-stream nozzles, necessary for the removal of accumulated sand 102 (FIG. 1). The lower end of conduit 62 is coupled to a cut, circular opening in the upper crest of container 40 by a weld 61. The upper end of the conduit 62 is coupled to a flange 64, by a weld 63. A flange-cap 65, is secured to flange 64 by bolts 66 to form a metal-to-metal, hydraulic seal. Components of an access port may be coupled to each other and access ports may be coupled to container 40 such that they form a hydraulic seal and possess a strength capable of withstanding anticipated differences in pressure between the exterior and interior of the settling system 100. In some implementations, weld 61 and/or conduit 62 may be coupled to container 40 such that they do not substantially protrude into an inner surface of the container. For example, conduit 62 may be welded such that the weld 61 is approximately flush with an inner surface of container 40.

In some implementations, needle valves or pressure-relief valves may be coupled to container 40 at various points to relieve internal pressure in the container prior to opening access ports 60, 70, or 80 for sand removal or prior to decoupling container 40 for repairs and/or for replacement.

A bypass line 90 may allow fluids 11 containing particles (e.g., sand) to flow through flowlines 101*a* and 101*b* while accumulated sand is removed from container 40 (e.g., by inserting a vacuum through access ports 60, 70, and 80). Bypass line 90 may have an internal diameter approximately equal to the internal diameter of flowlines 101*a* and 101*b*, and shell inlet and outline lines 30 and 50. Bypass line 90 may have a similar cross-sectional shape to flowlines 101*a* and 101*b* to facilitate coupling between lines. Bypass line 90 may be activated by opening a valve 91 and closing valves 32 and 52. A connector 92 may couple bypass line sections together.

The type, composition, wall-thicknesses, and coupling methods of the container, valves, lines, conduits, ports, etc. may be based on anticipated internal pressures during operation. For example, coupling may include bonding, gluing, welding, use of threaded or compression connections, bolting, cementing or other types of connecting techniques. In some implementations, containers, lines, conduits, ports, etc. may be include carbon steel because of its strength and ability to withstand pressure differences several multiples above atmospheric pressure. Materials of lesser strength, such as polyvinyl chloride (PVC), with respective threaded and cement bonding methods, can be used when internal pressures are not expected to deviate much above or below atmospheric pressure. Ball-valves are reliable and quickly activated and thus may be selected parts of the settling system. Other valve types, such as the gate-valve, can also be used.

The settling system may be located at any position within the span of a flowline where the use of the settling system is deemed advantageous for separating and accumulating sand from sand-laden fluids, and/or where the settling system can be easily accessed by vehicles and equipment needed to remove the sand from the settling system. A typical, but not only, location for the settling system is in close proximity to the wellhead, since the wellhead area is inherently accessible to rigs, vehicles, and equipment, needed for sand removal. An additional advantage to positioning the settling system near the wellhead is that a majority of the flowline may be protected from sand abrasion and blockages. Multiple settling systems may be placed in parallel or series configurations.

A number of implementations have been described. Nevertheless, it will be understood that various modifications may be made without departing from the spirit and scope of the various implementations. In addition, it is will be understood that the terminology used herein is for the purpose of describing particular implementations and is not intended to be limiting. As used in this specification, the singular forms "a", "an" and "the" include plural referents unless the content clearly indicates otherwise. Thus, for example, reference to "an access port" includes a combination of two or more access ports and reference to "a fluid" includes mixture of fluids. Accordingly, other implementations are within the scope of the following claims.

What is claimed is:

1. A settling system for intercepting solid particles within a stream of fluids flowing from a well head line and to a flow line, comprising:
   a container comprising:
      an inlet having a cross sectional area less than a cross sectional area of the container such that a velocity of fluid flowing from the inlet decreases, and wherein decreasing the velocity of fluid flowing the inlet allows solid particles in the fluid to settle to a lower region of the container;
      an outlet; and
      a plurality of access ports located on a top surface of the container, the ports adapted to permit mechanical removal of at least a portion of the settled particles from the lower region of the container without substantial human entry into the ports;
   wherein the container allows substantially unidirectional and unobstructed fluid flow between the inlet and the outlet and has a length such that during use less than about 25% of the solid particles in the fluid pass through the outlet; and
   a bypass line coupled to the container such that fluid may be inhibited from flowing into the container.

2. The settling system of claim 1, wherein the container is configured to allow fluid to flow through the container substantially uninhibited.

3. The settling system of claim 1, wherein the container further comprises an inner surface that does not substantially protrude into a cavity of the container.

4. The settling system of claim 1, wherein more than one of the access ports are coupled to the container such that more than one of the access ports do not substantially protrude into a cavity of the container.

5. The settling system of claim 1, wherein an access port allows accumulated solid particles to be removed from the container while excluding manned-entry into the container.

6. The settling system of claim 1, wherein a diameter of the container is approximately 18 to 24 inches.

7. The settling system of claim 1, wherein a length of the container is approximately 18 feet to approximately 20 feet.

8. A settling system for intercepting solid particles within a stream of fluids flowing from a well head line and to a flow line, comprising:
   a container comprising:
      an inlet having a cross sectional area less than a cross sectional area of the container such that a velocity of fluid flowing from the inlet decreases, and wherein decreasing the velocity of fluid flowing the inlet allows solid particles in the fluid to settle to a lower region of the container;
      an outlet; and
      an inner surface that does not substantially protrude into a cavity of the container; and
      a plurality of access ports located on a top surface of the container, the ports adapted to permit mechanical removal of at least a portion of the settled particles from the lower region of the container;
   wherein the container is configured to allow fluid to flow substantially unidirectionally and through the container substantially uninhibited.

9. The settling system of claim 8, wherein at least one of the plurality of access ports allows mechanical removal of at least a portion of the settled particles without substantial human entry into the port.

10. The settling system of claim 8, further comprising a bypass line coupled to the container such that fluid may be inhibited from flowing to the container.

11. The settling system of claim 8, wherein an access port allows accumulated solid particles to be removed from the container while excluding manned-entry into the container.

12. The settling system of claim 8, wherein a diameter of the container is approximately 18 to 24 inches.

13. The settling system of claim 8, wherein a length of the container is approximately 18 feet to approximately 20 feet.

* * * * *

UNITED STATES PATENT AND TRADEMARK OFFICE
CERTIFICATE OF CORRECTION

PATENT NO. : 7,731,037 B2  Page 1 of 1
APPLICATION NO. : 11/955161
DATED : June 8, 2010
INVENTOR(S) : Verlin Frazier It is certified that error appears in the above-identified patent and that said Letters Patent is hereby corrected as shown below:

In the Specification:

Column 1, lines 56-57, delete "possible-entrapment" and insert --possible entrapment,--.

Column 3, line 64, delete "that" and insert --than--.

Signed and Sealed this

Seventeenth Day of August, 2010

David J. Kappos
*Director of the United States Patent and Trademark Office*